United States Patent
Antczak et al.

(10) Patent No.: US 6,632,086 B1
(45) Date of Patent: Oct. 14, 2003

(54) QUARTZ FUSION CRUCIBLE

(76) Inventors: Stanley M. Antczak, 1243 Lake Forest Dr., Chesterland, OH (US) 44026; Mark A. Castelletti, 11760 Pinehurst La., Chardon, OH (US) 44024; Frederic F. Ahlgren, 203 Greenbriar Ct., Richmond Heights, OH (US) 44143

( * ) Notice: Subject to any disclaimer, the term of this patent is extended or adjusted under 35 U.S.C. 154(b) by 0 days.

(21) Appl. No.: 09/576,087

(22) Filed: May 22, 2000

(51) Int. Cl.[7] ............................................... C03B 3/00
(52) U.S. Cl. ............................. 432/13; 219/424; 65/135.9
(58) Field of Search .......................... 432/13, 97, 161; 373/18, 19, 22, 111; 219/121, 37, 421, 424; 65/135.6, 135.9; 266/217, 218, 223, 231, 236, 241

(56) References Cited

U.S. PATENT DOCUMENTS

| | | |
|---|---|---|
| 1,536,821 A | 5/1925 | Devers |
| 1,992,994 A | 3/1935 | Delpech |
| 2,038,627 A | 4/1936 | Badger |
| 2,485,851 A | 10/1949 | Stevens |
| 2,852,891 A | 9/1958 | George |
| 2,998,469 A | 8/1961 | Vatterodt |
| 3,128,169 A | 4/1964 | Heraeus et al. |
| 3,205,292 A | 9/1965 | Descarsin |
| 3,212,871 A | 10/1965 | Vatterodt |
| 3,320,045 A | 5/1967 | Weiss et al. |
| 3,395,997 A | 8/1968 | Bryant et al. |
| 3,764,286 A | 10/1973 | Antczak et al. .......... 765/135.6 |
| 4,545,798 A | * 10/1985 | Matesa ........................ 432/264 |
| 5,104,432 A | * 4/1992 | Williams et al. ............... 373/22 |
| 5,934,900 A | * 8/1999 | Billings ....................... 432/264 |
| 6,250,111 B1 | * 6/2001 | Murakami et al. .......... 65/135.2 |

FOREIGN PATENT DOCUMENTS

| | | |
|---|---|---|
| JP | 02022132 | 1/1990 |
| WO | WO 0242230 | 5/2002 |

* cited by examiner

Primary Examiner—Gregory Wilson

(57) ABSTRACT

A crucible for melting a silica for fusion of said silica into a desired shape. The crucible having a main body with inner and outer surfaces comprised of a refractory material. In addition, at least a portion of the inner surface includes a barrier layer comprised of a material selected from rhenium, osmium, iridium, and mixtures thereof.

14 Claims, 2 Drawing Sheets

QUARTZ FUSION CRUCIBLE

BACKGROUND OF THE INVENTION

The present invention relates to a method and apparatus for the continuous production of tubing, rods and the like from crystalline quartz or other glass like materials. More particularly, this invention relates to a crucible for use in the production of elongated quartz members from a silica melt.

Various elongated members have been formed continuously by melting of quartz crystal or sand in an electrically heated furnace whereby the desired shape is drawn from the furnace through a suitable orifice or die in the bottom of the furnace as the raw material is melted. One apparatus for continuous production of fused quartz tubing, for example, is a tungsten-lined molybdenum crucible supported vertically and having a suitable orifice or die in the bottom to draw cane, rods, or tubing. The crucible is surrounded by an arrangement of tungsten heating elements or rods which heat the crucible. The crucible, together with its heating unit, is encased in a refractory chamber supported by a water-cooled metal jacket. The crucible is heated in a reducing atmosphere of nitrogen and hydrogen. Because tungsten is transported into the melt, it is important to maintain a relatively low temperature of about 2000° C.

An alternative apparatus provides clear fused quartz tubing by feeding natural quartz crystal into a refractory metal crucible heated by electrical resistance under a unique gas atmosphere to reduce the bubble content. The bubbles formed by gas entrapment between crystals and the molten viscous mass of fused quartz do not readily escape from the molten glass and, hence, remain as bubbles or ridges in the product drawn from the fused quartz melt. By substituting a melting atmosphere gas which readily diffuses through the molten material (such as pure helium, pure hydrogen or mixtures of these gases) it was possible to reduce the gas pressure in the bubbles and thereby reduce the bubble size. This process uses a mixture of 80% helium and 20% hydrogen by volume.

In a further alternative method, a product is obtained by continuously feeding a raw material of essentially pure silicon dioxide in particulate form into the top section of an induction-heated crucible, fusing the raw material continuously in an upper-induction heat zone of the crucible in an atmosphere of hydrogen and helium while maintaining a fusion temperature not below approximately 2050° C. The fused material in the lower zone of the crucible is heated by separate induction heating means to produce independent regulation of the temperature in the fused material. The fused material is continuously drawn from the lower zone of the crucible through forming means in the presence of an atmosphere of hydrogen containing a non-oxidizing carrier gas.

Unfortunately, most of the refractory metals and non-metal materials used in the crucibles of the above-described apparatus react with silica at high temperatures. At these temperatures, oxides of the refractory materials dissolve and diffuse into the silica and contaminate the glass. Such refractory material contamination causes discoloration and occlusions in the silica glass fused in crucibles made of such refractory materials. For example, refractory materials used in traditional crucibles leave at least from 12–300 ppb of the refractory materials in the silica melt. Accordingly, there is a need in the art to reduce contamination of fused glass occurring from the refractory materials. This need has increased recently as semiconductor and fiber optics manufacturing processes, a primary use for the glass products obtained from the subject production process, have required higher levels of purity.

Furthermore, the amount of refractory metal in the silica glass melt is believed to be proportional to the fusion temperature. Therefore, unless a very strict control over the furnace operating temperature is exercised, levels of refractory metal contamination can easily become unacceptable. Of course, such strict temperature operational limits imposed on the furnace operation are problematic. In fact, strict temperature limits can detract from a typical need for the higher fusion temperatures which are used to achieve better visual characteristics in the resultant fused quartz product.

BRIEF SUMMARY OF THE INVENTION

In an exemplary embodiment- of the invention, a crucible for melting of silica and subsequent drawing into a desired shape is comprised of a body having an outer surface constructed of a refractory material and including a inner lining of a non-reactive barrier material selected from rhenium, osmium, iridium or mixtures thereof In a preferred embodiment, the non-reactive barrier lining between 0.010" and 0.050" in depth.

The present crucible construction provides a number of advantages over the prior art. Particularly, furnaces constructed with rhenium, iridium, and/or osmium lined crucibles produce products with much lower levels of refractory metal in the solution. For example, the metal dissolved in the silica can be reduced to below 10 ppb, preferably below 1 ppb, and preferably below the current level of detection via NAA. This reduced amount of refractory metal contamination in the silica melt improves the chemical composition of the silica glass allowing for a decrease in discoloration and surface haze. Furthermore, utilization of a furnace equipped with a crucible including the non-reactive lining allows operation at optimum temperature ranges. More specifically, the non-reactive crucible allows the furnace to operate at temperatures in excess of 2350° C. Operation at these higher temperatures achieves better fining. Moreover, operation at optimum fusion temperatures will increase solubility of gaseous species in the raw material, thus reducing airline defects in the drawn products. Similarly, the present inventive crucible will also help to further reduce the presence of haze and discoloration in the resultant glass products.

It should be noted that the terms "quartz" and "silica" are used interchangeably throughout this application, both being directed generally to the compound $SiO_2$. Similarly, the present invention encompasses the use of any raw material introduced to the melting furnace, including but not limited to natural silica/quartz and synthetic silica.

BRIEF DESCRIPTION OF THE DRAWINGS

The structure, operation and advantages of the present preferred embodiment of this invention will become further apparent upon consideration of the following description, taken in conjunction with the accompanying drawings, wherein.

DETAILED DESCRIPTION OF THE INVENTION

Figure 1:
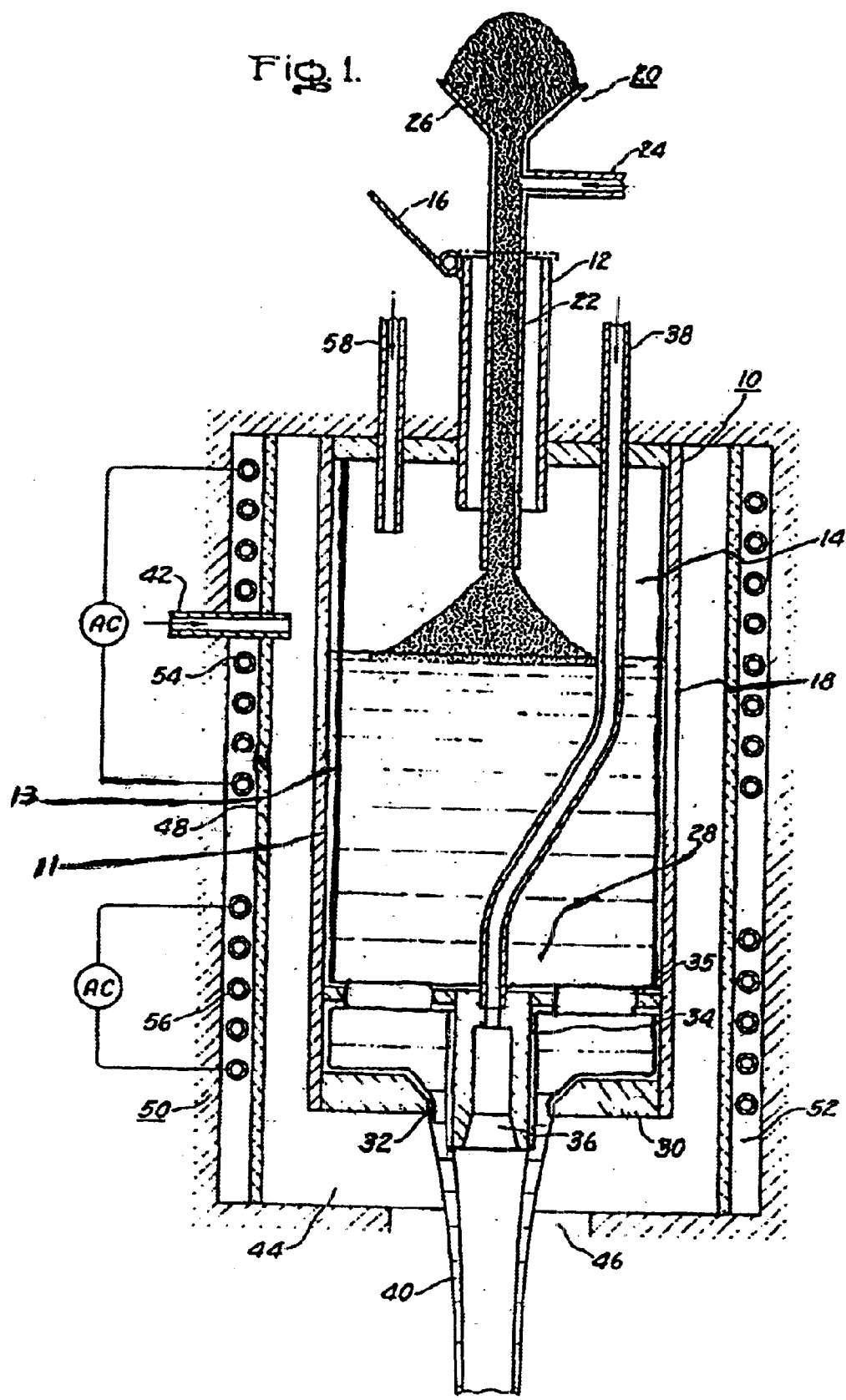
FIG. 1 is a longitudinal sectional view of a furnace of the present invention.

In one of its preferred embodiments, the fused quartz product of the present invention can be formed in a furnace configuration having the features shown in FIG. 1. Moreover, FIG. 1 demonstrates the suitability of the present inventive construction technique in the rebuild of an existing furnace design. More particularly, the furnace has a general cylindrical shape. Preferably, an elongated cylindrical melting crucible 10 constructed of a refractory metal layer 11, such as tungsten or molybdenum as well as combinations thereof, is used. The melting crucible 10 further includes a lining of rhenium 13 over the refractory metal layer 11.

A purified sand raw material is fed through a top opening 12 into an upper melting zone 14 of the crucible member. The top opening 12 is provided with movable closure means 16, such as a trapdoor which can be kept closed except for observing the level of the melt 18 and during feeding of the raw material into the crucible. Automatic feeder means 20 are provided at the top opening of the crucible member to maintain a predetermined level of the raw material in the crucible. The feeder includes a discharge tube 22 having its outlet opening located the crucible 10 so as to provide the raw material in the upper zone where melting takes place, a purge gas inlet tube 24 and reservoir means 26 which contains supply of the raw material being fed automatically to the discharge tube.

Simple gravity flow of the raw material to the melting zone of the crucible member takes place as the melt level in the crucible drops with fusion of the sand particles so that it becomes unnecessary to incorporate any further means to adjust the rate of feeding the raw material as described. The purge gas being supplied to the feeder helps eliminate gases contained in the raw material which could otherwise oxidize the refractory metal components of the crucible member or form bubbles in the fused quartz melt which cannot thereafter be removed or minimized in a manner to be described in part immediately hereinafter. The composition of said purge gas is the same or similar to that admitted elsewhere to the upper zone of said crucible member for the purpose of reducing bubbles and ridges in the final product and which consists of a gas mixture of hydrogen and helium in the volume ratios 40–100% hydrogen and 60–0% helium.

The lower portion 28 (a drawing zone) of the crucible 10 includes an annular ring 30 having central opening 32 through which the elongated fused quartz member is continuously formed by drawing the viscous material through the opening. A core 34 is centrally disposed in the opening 32 and extends below the annular ring as the means of forming tubing from the viscous material being drawn from the melt. As known by the skilled artisan, the position of the core can be shifted as necessary to produce the desired size of extrudate. Support element 35 is affixed to the wall of the crucible and provides rigid support of the core which helps to maintain a constant size opening from which the product is being drawn. The core is fabricated with a hollow interior 36 which is connected to inlet pipe 38 so that supply of non-oxidizing gas having a different composition than supplied to the melting zone of the crucible can be furnished as a forming atmosphere while the tubing 40 is being drawn.

A second inlet pipe 42 supplies the same type forming atmosphere which can be a mixture containing hydrogen in a non-oxidizing carrier gas such as nitrogen in volume ratios 1–20% hydrogen and 99–80% carrier gas as a protective atmosphere which surrounds the exterior wall of the crucible. This supply of forming gas is provided to annular space 44 which provides a housing means for the crucible and includes a central bottom opening 46 providing exhaust means from said cavity for the forming gas in a manner which envelops the exterior surface of the elongated fused quartz member being drawn from the furnace. The exterior wall of the annular space comprises a refractory cylinder 48 which in combination with exterior housing 50 of the furnace construction serves as the container means for the induction heating coils of the apparatus. More particularly, a concentric passageway 52 is defined between the exterior wall of the refractory cylinder 48 and the interior wall of housing 50 in which is disposed two helical-shaped induction heating coils 54 and 56 supplying separate heating sources for the upper and lower zones of the crucible, respectively. Of course, additional coils may be employed as governed by the size of the furnace, for example, it may be beneficial to include additional coil(s) in the finish zone.

The heating sources and the power supplies thereto can be of conventional construction which include electrical conductors that are hollow for water cooling and electrically connected to separate A.C. power supplies for the independent heating utilized in the practice of the present invention. The remainder of the passageway occupied by the coils is preferably packed with a stable refractory insulation such as zirconia in order to conserve heat in the furnace.

A third supply pipe 58 is located in the top section of exterior housing 50 and supplies the same or similar purge gas mixture to the melting zone of the crucible as provided by inlet pipe 24. The above-described furnace is operated in connection with conventional tube or rod drawing machinery which has been omitted from the drawing as forming no part of the present invention.

Of course, the present inventive use of a non-reactive crucible lining is not limited to the furnace or crucible shown in FIG. 1. In fact, the use of the non-reactive lining is suitable for use in any furnace/crucible embodiment known to the skilled artisan (e.g. FIG. 2).

In accordance carrying out the process of the present invention in the above-described apparatus, a natural silica sand having a nominal particle size of −50 mesh U.S. screen size which has been purified by chemical treatment to the nominal impurity content below is supplied to the top opening of the crucible member in the apparatus.

| | RAW MATERIAL | |
|---|---|---|
| Impurity | Natural (p.p.m.) | Synthetic (p.p.m.) |
| $Fe_2O_3$ | 1 | 0.07 |
| $TiO_2$ | 2 | <.02 |
| $Al_2O_3$ | 20 | 100 |
| CaO | 0.4 | <.01 |
| MgO | 0.1 | <.05 |
| $K_2O$ | 0.6 | 0.1 |
| $Na_2O$ | 0.7 | 0.1 |
| $Li_2O$ | 0.6 | <.05 |
| B | <0.2 | — |
| $ZrO_2$ | <1.0 | <.02 |

The above raw material is provided to the crucible member which has been heated in excess of 2050° C. while also being supplied with the hydrogen and helium gas mixture hereinbefore specified. After a predetermined melt level of fused quartz has been established in the crucible and the molten material caused to flow by gravity through central bottom opening 32 in the crucible member, tubing or rod is then drawn continuously by the drawing machine (not shown) in the presence of a forming gas atmosphere as hereinbefore specified. In any continuous drawing of tubing/rod in the foregoing described manner, the electrical power being supplied to the lower heating coil 56 is typically maintained at a lower level than the electrical power being supplied to the upper heating coil 54 in order to lower the temperature of the material as it is being drawn to below a temperature of 2050° C. However, the inventive use of a non-reactive lining in the finish zone can allow higher temperature operation if desired. The combined effect of these process steps whereby the level of raw material in the crucible is maintained relatively constant while distinct temperature zones are maintained during the drawing operation has been found to permit outside diameter variation in the drawn product to less than about ±3% over various sizes of tubing.

As stated above, the internal surface of the furnace crucible 10 includes a rhenium, osmium or iridium sheet or coating 13. The coating 13 may be applied to the refractory metal layer 11 by chemical vapor deposition, electrolysis, plasma spray or any other technique known to the skilled artisan (hereinafter referred to as "chemical bonding"). The non-reactive layer 13 may also be physically attached to the refractory metal layer 11 by attaching a sheet directly to the wall of the crucible with rivets, bolts, screws, etc., preferably constructed from the same or similar material as the non-reactive lining itself Alternatively, a properly shaped rhenium sleeve can be inserted into the crucible. In fact, a combination of coating or lining methods may be used depending on the geometric complexity of the segments comprising the crucible assembly.

Figure 2:
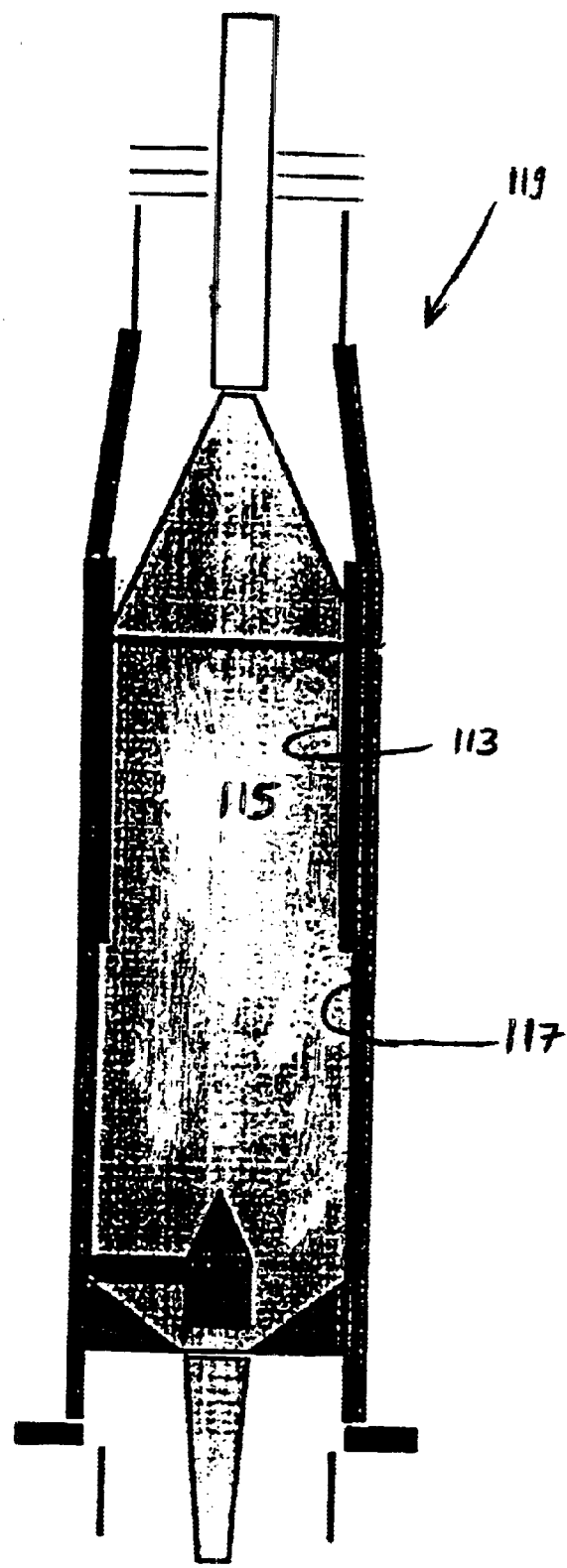
FIG. 2 is a diagrammatic longitudinal view of an alternative furnace demonstrating use of the present inventive construction in the melt zone of a furnace.

Referring now to FIG. 2, the application of the present inventive coating applied only to the melt/fusion zone is demonstrated. Moreover, a coating of rhenium 113 is applied in the melt/fusion zone 115 on the inner wall 117 of the crucible 119. In this manner, the most advantageous high temperature area (the melt zone) is protected from tungsten/molybdenum contamination by the barrier layer.

EXAMPLES

Several furnace experiments using rhenium lining or coatings were performed. Furnaces used in these experiments were equipped with tungsten crucibles to which rhenium lining was attached by a combination of screws or rivets and also by plasma spray coat. Various tube products drawn during the tests were analyzed to determine levels of contamination. Results of neutron activation analysis (NAA) and x-ray florescence surface analysis (XRF) show significant differences in levels of tungsten concentration in samples of tubing made from lined and unlined furnaces. See more particularly, the following table.

|  | Without Coating or Liner | | With Rhenium | |
|---|---|---|---|---|
| Type of tubing | NAA, W ppb | XRF, W ppm | NAA, W ppb | XRF, W ppm |
| Natural Silica |  | 14 to 20 |  | <5 |
| Synthetic silica | 10 to 30 |  | 0.2 to 1.0 |  |

Accordingly, it has been demonstrated that the present invention achieves a reduction in contamination of the fused silica product. The resultant benefits described above are therefore achieved.

While the invention has be described by reference to a preferred embodiment, it will be understood by those skilled in the art that various changes may be made and equivalents may be substituted for elements without departing from the scope of the invention. In addition, any modifications may be made to adapt a particular situation or material to the teachings of the invention without departing from the essential scope thereof. Therefore, it is intended that the invention not be limited to the particular embodiment disclosed as the best mode contemplated for carrying out this invention, but the invention will include all embodiments falling within the scope of appended claims.

What is claimed is:

1. A furnace for melting silica for fusion into a desired shape, said furnace comprising a body having a first layer comprised of a refractory material, and further including a barrier layer comprised of a protective material comprising rhenium, disposed on an inner surface of said first layer.

2. The furnace of claim 1 wherein said refractory material is comprised of tungsten, molybdenum or mixtures thereof.

3. The furnace of claim 1 wherein said barrier layer is between about 0.010 and 0.050 inches in depth.

4. The furnace of claim 1 wherein said barrier layer is chemically bonded to said first layer.

5. The furnace of claim 1 wherein said barrier layer is physically attached to said first layer.

6. The furnace of claim 5 wherein said barrier layer is attached via rivets, bolts, or screws to said first layer.

7. The furnace of claim 5 wherein said barrier layer comprises a sleeve, sized to mate concentrically with said first layer.

8. The furnace of claim 1 comprising at least a melt zone and a drawing zone, at least one of said melt zone or said drawing zone including said barrier layer.

9. The furnace of claim 8 wherein said barrier layer is located in said melt zone of said crucible.

10. A furnace for melting silica, said furnace comprising:
   a body comprising:
   a first layer formed from a refractory material comprising tungsten, molybdenum, or a mixture thereof, and
   a barrier layer disposed on an inner surface of the first layer, the barrier layer being formed from a protective material selected from the group consisting of rhenium, osmium, iridium, and mixtures thereof which reduces contamination of the silica by the refractory material; and
   a heating source which heats the furnace to a temperature in excess of 2050° C.

11. The furnace of claim 10, wherein the barrier layer protective material is rhenium.

12. The furnace of claim 10, wherein the barrier layer is between about 0.010 and 0.050 inches in depth.

13. The furnace of claim 10, wherein the barrier layer is physically attached to said first layer.

14. The furnace of claim 10, further including a source of an inert gas which supplies an inert gas atmosphere to the furnace.

* * * * *